United States Patent
Randall et al.

(10) Patent No.: US 9,756,389 B2
(45) Date of Patent: Sep. 5, 2017

(54) SYSTEMS AND METHODS FOR DIGITAL MEDIA STORAGE AND PLAYBACK

(71) Applicant: Really Simple Software, Inc., Tiburon, CA (US)

(72) Inventors: Bruce Randall, Painswick (GB); Barrett Stump, Petaluma, CA (US)

(73) Assignee: Really Simple Software, Inc., Tiburon, CA (US)

( * ) Notice: Subject to any disclaimer, the term of this patent is extended or adjusted under 35 U.S.C. 154(b) by 0 days.

(21) Appl. No.: 14/921,727

(22) Filed: Oct. 23, 2015

(65) Prior Publication Data

US 2016/0119679 A1 Apr. 28, 2016

Related U.S. Application Data

(60) Provisional application No. 62/068,490, filed on Oct. 24, 2014.

(51) Int. Cl.
*H04N 7/16* (2011.01)
*H04N 21/4627* (2011.01)
(Continued)

(52) U.S. Cl.
CPC ......... *H04N 21/4627* (2013.01); *G11B 27/10* (2013.01); *H04N 21/2347* (2013.01); *H04N 21/234309* (2013.01); *H04N 21/2541* (2013.01); *H04N 21/2743* (2013.01); *H04N 21/4126* (2013.01); *H04N 21/4147* (2013.01); *H04N 21/4334* (2013.01); *H04N 21/4408* (2013.01); *H04N 21/4431* (2013.01); *H04N 21/8186* (2013.01); *H04N 21/8456* (2013.01); *H04N 21/4622* (2013.01); *H04N 21/8586* (2013.01)

(58) Field of Classification Search
CPC ......................... H04N 21/231; H04N 21/2747
See application file for complete search history.

(56) References Cited

U.S. PATENT DOCUMENTS 5,930,473 A * 7/1999 Teng ........................ H04L 29/06
709/204
9,088,634 B1 * 7/2015 Corley .................. H04L 65/605
(Continued)

OTHER PUBLICATIONS

Boxee TV; http://www.boxee.tv/; downloaded Mar. 24, 2017.
(Continued)

*Primary Examiner* — Fernando Alcon
(74) *Attorney, Agent, or Firm* — Fitch, Even, Tabin & Flannery LLP

(57) ABSTRACT

Methods and systems for storage and playback of broadcast media received via a local digital video recording (DVR) system. The system includes the DVR system configured to receive the broadcast media and upload the broadcast media to a storage server over a network. The DVR system divides the broadcast media content into blocks and assigns a unique block ID to each block based on the block data. Prior to uploading each block to the storage server, the unique block ID is sent to the storage server, which only uploads and stored the block if a duplicate block has not already been stored on the storage device, minimizing network demand. A transcoding server coupled to the storage server transcodes the broadcast media content for streaming over the network.

21 Claims, 8 Drawing Sheets

(51) Int. Cl.

| | |
|---|---|
| *H04N 21/4147* | (2011.01) |
| *H04N 21/254* | (2011.01) |
| *H04N 21/4408* | (2011.01) |
| *H04N 21/2347* | (2011.01) |
| *G11B 27/10* | (2006.01) |
| *H04N 21/845* | (2011.01) |
| *H04N 21/2343* | (2011.01) |
| *H04N 21/2743* | (2011.01) |
| *H04N 21/41* | (2011.01) |
| *H04N 21/433* | (2011.01) |
| *H04N 21/443* | (2011.01) |
| *H04N 21/81* | (2011.01) |
| *H04N 21/462* | (2011.01) |
| *H04N 21/858* | (2011.01) |

(56) References Cited

U.S. PATENT DOCUMENTS

| | | | | |
|---|---|---|---|---|
| 9,112,943 | B1* | 8/2015 | Vulkan | H04N 21/8352 |
| 2001/0027555 | A1* | 10/2001 | Franken | H04N 7/17327 |
| | | | | 725/1 |
| 2003/0226150 | A1* | 12/2003 | Berberet | H04N 7/17318 |
| | | | | 725/94 |
| 2006/0041902 | A1* | 2/2006 | Zigmond | H04H 60/31 |
| | | | | 725/9 |
| 2010/0011390 | A1* | 1/2010 | Coles | H04N 5/775 |
| | | | | 725/25 |
| 2012/0179788 | A1* | 7/2012 | McGowan | H04N 21/44222 |
| | | | | 709/219 |
| 2013/0061260 | A1* | 3/2013 | Maskatia | G07F 17/005 |
| | | | | 725/28 |
| 2013/0308436 | A1 | 11/2013 | Li | |
| 2014/0165116 | A1* | 6/2014 | Major | G06F 21/6218 |
| | | | | 725/89 |

OTHER PUBLICATIONS

Gartenberg; "Tivo's leaked Mavrik is a cloud-based DVR"; The Verge; Nov. 8, 2016; http://www.theverge.com/circuitbreaker/2016/11/8/13565660/tivo-mavrik-over-the-air-clo . . . ; pp. 1-4; downloaded Mar. 24, 2017.

Sling TV; https://www.sling.com/; 2017; pp. 1-5 and 54-57; downloaded Mar. 24, 2017.

* cited by examiner

SYSTEMS AND METHODS FOR DIGITAL MEDIA STORAGE AND PLAYBACK

This application claims the benefit of U.S. Provisional Application No. 62/068,490, entitled SIMPLE TV DIGITAL MEDIA STORAGE AND PLAYBACK SYSTEM, filed Oct. 24, 2014, which is incorporated in its entirety herein by reference.

BACKGROUND OF THE INVENTION

1. Field of the Invention

The present invention relates generally to systems and methods for network storage and playback of digital media, and more specifically to systems and methods for network storage and playback of digital media received from non-network sources.

2. Discussion of the Related Art

Non-network digital media are currently received from three main sources: Over-The-Air (OTA) digital signals, signals from a satellite media provider, and media provided through a cable television connection. Digital Video Recorders (DVRs) such as TiVo include storage for digital media whereby the user can store a program received through the non-network course for future playback.

DVRs include the aforementioned storage (typically a USB or SATA attached hard drive) and may also include transcoding capability to enable streaming through a home computer network as the media received through the non-network sources are not configured for streaming through the home network. Including transcoding capabilities in the DVR increases the cost of the DVR and also increases power consumption.

Cloud storage (i.e. storage of digital files in a remote location accessible through the internet) is becoming increasingly common. However, as non-network media may be protected by copyrights and also may not be made available to users in certain areas (such as sports blackout locations), simple storage of media in the cloud and downloading does not address issues with limiting program availability to certain users.

SUMMARY OF THE INVENTION

Several embodiments of the invention advantageously address the needs above as well as other needs by providing a digital media storage and playback system comprising a DVR system associated with a user and connected to a network, comprising an A/V module configured to capture and store broadcast media content and prepare the broadcast media content for uploading on a network, a local system processor coupled to the A/V module and configured to divide captured broadcast media content into a plurality of blocks and associate a block ID with each block, the hash determined by a hash algorithm whereby blocks comprising duplicate content are associated with identical block IDs; a local system non-transitory memory coupled to the processor, a local system network port configured to connect to the network and send and receive data through the network, wherein each hash associated with the plurality of media content blocks is transmitted to a storage server through the network; and the storage server connected to the network, comprising a server non-transitory memory; a server processor configured to perform the steps of: receive each block ID from the DVR system, and compare the received block ID with contents of a block ID database stored on the storage server and configured to store block IDs, whereby if the received block ID fails to match one of the stored block IDs the block associated with the block ID is uploaded to the server and the received block ID is stored in the block ID database, whereby the broadcast media content is stored on the storage server.

In another embodiment, the invention can be characterized as a method for storing broadcast media content, comprising the steps of: receiving by a DVR system of broadcast media content, the local system comprising an A/V module, a non-transitory memory, and a local system processor, wherein the DVR system is in communication with the network; dividing by the DVR system of the broadcast media content into a plurality of blocks; associating by the DVR system of a block ID with each block of the broadcast media content, the block ID determined by a hash algorithm whereby blocks comprising duplicate content are associated with identical block IDs; sending by the DVR system of each block ID to a storage server via the network; comparing by the storage server of the received block ID with contents of a block ID database stored on the storage server and configured to store block IDs, whereby if the received block ID fails to match one of the stored block IDs the block associated with the block ID is uploaded to the server and the received block ID is stored in the block ID database, whereby the broadcast media content is stored on the storage server.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
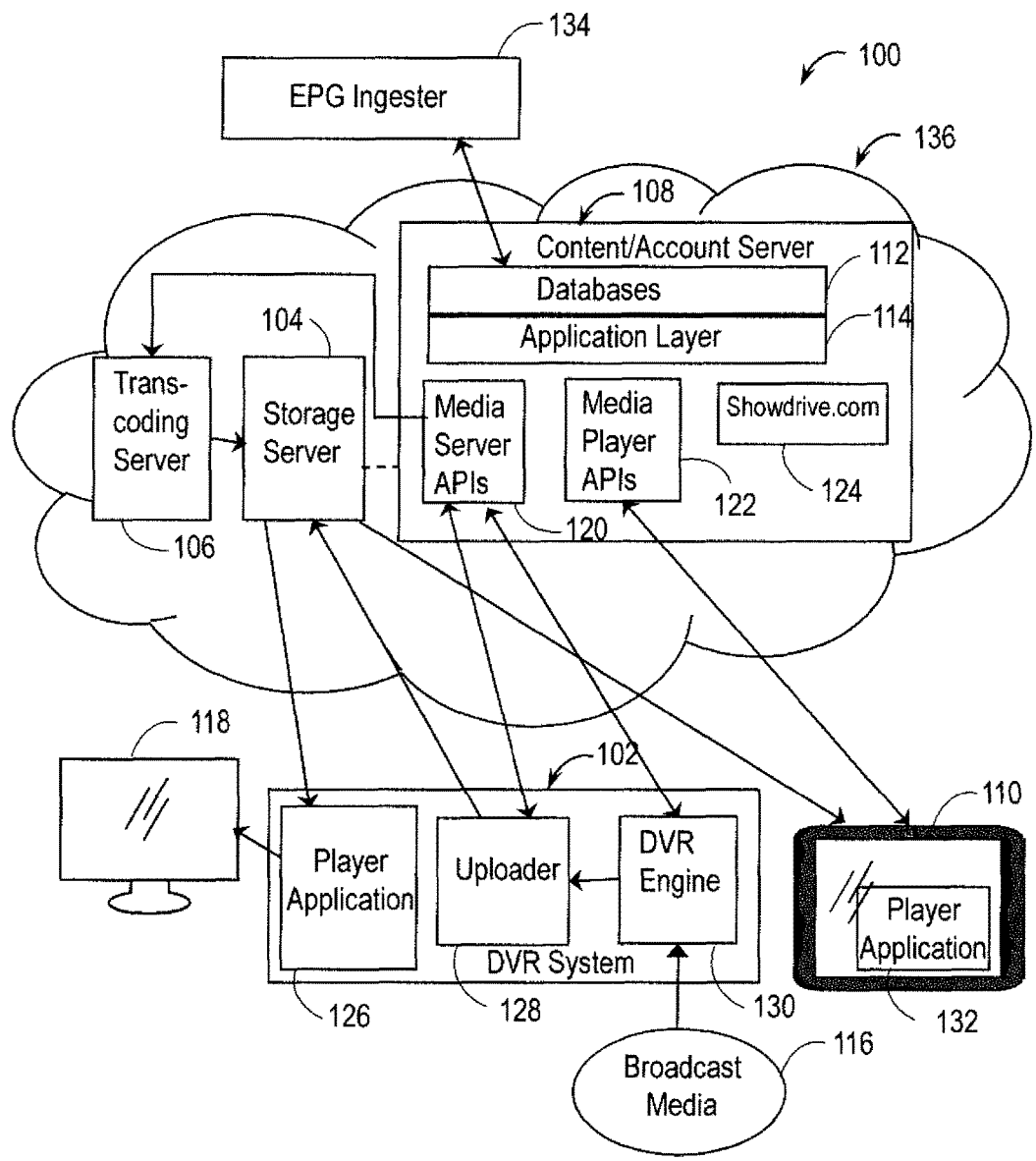
FIG. 1 is a schematic diagram of a digital media storage and playback system in one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a schematic diagram of a digital media storage and playback system 100 (also referred to as the digital media system) is shown in one embodiment of the present invention. Shown are a DVR system 102, a storage server 104, a transcoding server 106, a content/account server 108, a computing device 110, a plurality of databases 112, an application layer 114, a broadcast media source 116, a display 118, at least one media server application programming interface (API) 120, at least one media player API 122, a showdrive.com 124, a DVR system player application 126, a DVR system uploader module 128, a DVR engine 130, a computing device player application 132, an EPG ingester 134, and a remote system 136.

The digital media system 100 is comprised of two basic elements: a home system comprising the DVR system 102 and the cloud-based remote system 136 including the storage server 104, the transcoding server 106 and the content/account server 108. The servers 104, 106, 108 are in communication with the DVR system 102 through an internet connection or other data communication link.

The DVR System 102 is configured to receive at least one type of broadcast media source 116, including over-the-air (OTA), satellite or cable TV through the DVR engine 130. The DVR engine 130, as is generally known in the art, is configured to receive and record broadcast media content according to a schedule or user direction. The DVR engine 130 is generally also configured to output content received from the broadcast media source 116 for displaying on the display 118, and to enable a live pause/review feature. The display 118 may be an external display communicatively coupled to the DVR system 102, as shown in FIG. 1, or the DVR system 102 may be included in a combined media housing including the DVR system and the display 118, for example as in a "smart" TV. For an external display, the display 118 may be coupled to the DVR system 102 through an A/V cable, through a wireless network, or any other method of transferring the media to the display 118. The display 118 may be a conventional television, smart TV, a monitor, or any other display device configured to receive and display the media from the DVR system 102.

The DVR system 102 includes the uploader, which includes software configured to demodulate the broadcast media and upload it to the storage server 104 according to the processes described further below. The uploader module 128 may also include a dedicated processor and non-transitory memory, or may be coupled to a central processor and memory as shown below in FIG. 2. The DVR System 102 also includes the DVR system player application 126, including software for discovering available programs via the content/account server 108, and playing the available recordings on the display 118. The DVR system 102 is described in more detail below in FIG. 2.

The media system 100 may also include one or more portable computing devices, as illustrated by the computing device 110 shown in FIG. 1. The computing device 110 is in network communication with the storage server 104 and the content/account server 108. The first computing device include a computing device player application 132 run by the computing device, which is configured to communicate with the storage server 104 and the content/account server 108. The computing device player application 132 is configured to discover media available for the user to stream via the system, request media from the content/account server 108, receive the requested media from the storage server 104, and display the media on a display of the computing device 110. The computing device 110 may be a smartphone, tablet, desktop computer, smart TV, console gaming device, or other computing device configured to communicate with the remote system 136, and receive/display media from the remote system 136.

The remote system 136 comprises the storage server 104, the transcoding server 106, and the content/account server 108. The uploader module 128 receives a demodulated broadcast program file from the DVR engine 130 then uploads the demodulated/demultiplexed (PID selected/filtered) file (or stream via a transitory buffer) to the storage server 104, as described further below. The storage server 104 sends the broadcast program file to the transcoding server 106, which transcodes the programs for online streaming, and sends the transcoded broadcast program file to the storage server 104, where it is stored on the storage server 104. The storage server 104 presents as a static file server to clients and can respond to HTTP GET operations as a conventional file server.

The transcoded broadcast program may be requested for streaming via a request made by the DVR system player application 126 or the computing device player application 132 to the media player APIs 122 of the content/account server 108. The relevant media player API 122 then returns a location (URL) in the storage server 104 to the DVR system 102. The DVR system 102 then sends a request to the storage server 104 to stream the media at the location. The broadcast program at the location is then streamed to the requesting device. Streaming of the broadcast media to the device is described further below in FIG. 6.

The storage server 104, content/account server 108 and transcoding server 106 may be stand-alone systems comprising one or more computing devices and/or one or more computer servers, or may be one or more "virtual" servers located in the cloud, such as Amazon Web Services. General requirements for each server 104, 106, 108 comprise: at least one CPU (virtualized or physical), approximately 8 GB to 30 GB of file storage memory, an operating system configured to run the required software, hardware and applications, at least 8 GB of non-transitory memory coupled to the CPU, an enterprise class backing storage system (also referred to as a backing store) such as AWS S3 with 10 GigE (10 gigabits per second Ethernet connection) connectivity to transcoding and storage servers 104, 106, a load balancer infrastructure, a high performance database and caching infrastructure (in one embodiment, a combination of MySQL DB, Redis Caching DB and MemCached instances), and connectivity to high speed internet. The storage server 104 and the transcoding server 106 also include a minimum of 10 GigE connectivity.

The content/account server 108 includes a plurality of databases 112 configured to store electronic program guide (EPG) data received from the EPG ingester 134 coupled to the system 100. The EPG ingester 134 periodically receives EPG data and rich metadata for stored broadcasts (e.g. extended program description, imagery, cast and crew, related content and recommendations, etc.) from a third-party, converts the received data to a format compatible with the media system 100 internal format and sends the data to the content/account server 108, where it is stored in the databases 112. The databases 112 also include lists of user recordings (i.e. recordings belonging to specific user) and catalogs of user recordings. The content/account server 108 includes the application layer 114 coupled to the databases 112, which maintains the EPG data, rich metadata, and lists/catalogs of user recordings. The content/account server 108 also includes the media server APIs, which handle updating of the system 100 for newly uploaded programs as received from the DVR uploader.

The media player APIs 122 are in contact with media players requesting information or a program, e.g. the DVR system 102 and/or the computing device 110, whereby a user can obtain a list of available recordings, fetch rich metadata, and play an available recording.

The content/account server 108 also maintains a website configured to present and play recordings using a web browser.

In general operation, the DVR system 102 receives the broadcast media source 116 content. The user selects a broadcast media program (content) to be stored on the remote system 136, so that the broadcast media program will be available for future streaming back to the DVR system 102 (and displayed on the display 118) or to one of the computing devices. As multiple users may be attempting to store the same broadcast program, systems and methods have been devised to minimize uploading of duplicate programs. As the DVR system 102 receives the broadcast program, it divides the program into sequential portions called blocks. For each block, the DVR system 102 sends a unique identifying ID (the block ID) to the remote system 136 prior to uploading of the block. For each program, the storage server 104 creates a file for storage of the program media. If the identifying block ID does not match an existing block ID, the block ID along with offset and size is appended to the program file and the block data is written to the backing store (S3) where the block data can be later referenced by the block ID. If the identifying block ID is matched by a block ID for a block previously stored on the remote system 136, the block ID is written to the program file but the block data itself is not uploaded from the DVR system 102. This method is described further below in FIG. 3.

The remote system 136 transcodes all of the stored blocks for network streaming, then stores the reassembled broadcast file on the storage server 104. In one embodiment, a database indicating which users have requested that the broadcast media be stored. In this way, only users who have had previously access to the media through the previously received broadcast may have access to the stored media. In another embodiment, the content/account server 108 manages authentication. For example, when the player application 126, 132 requests a program, the content/account server 108 verifies that the user has playback rights for that program, then issues a unique URL containing authentication token to the player application 126, 132. The player application 126, 132 then sends the token to the storage server 104 to request the program. The storage server 104 presents the URL back to the content/account server 108 to validate that the token in the URL is allowed, as indicated by the dashed line between the storage server 104 and the content/account server 108 in FIG. 1. As part of this validation the content/account server 108 applies policy checks, for example, does the requestor IP address match the IP address when the URL was requested, or has the URL time expired.

The user may then send a request for the media to the remote system 136 (through the DVR system 102 or one of the computing devices), whereby upon authenticating the request (i.e. determining that a user associated with the DVR uploaded the original broadcast media content to the remote system 136, and is thus entitled to view the content using the streaming service), the remote system 136 streams the transcoded file to the receiving system or device.

In this way, the broadcast media (content) is always performed on the user's device and faithfully reproduced on the user's viewing device. The reproduction may include drop-outs and local advertising. Additionally, the system 100 is not "content aware", i.e. the de-duplication capabilities are not based on the knowledge of what the particular content is, (e.g. an episode of "The Big Bang Theory") but is based on what broadcast content has been received by the user's DVR system 102.

While the system 100 is optimized to limit storage requirements and upload, each user still receives their own copy of a recording. Optimization and compression techniques are done at the raw block level. In some cases, the system 100 is "video/audio aware" to improve the performance of the optimization techniques.

Control and access to the broadcast content is performed using common authentication and encryption practices. In some embodiments, a DRM (digital rights management) and content protection system can be implemented.

With the digital media system 100, the DVR system 102 does not need transcoding capability, as the transcoding is performed in the remote system 136, so that the DVR system 102 requirements are simplified. The DVR system 102 may be a set-top box, or may in some embodiments be integrated into a TV or other display.

The digital media system 100 can be deployed in other scenarios such as generalized media server applications deployed on desktop computing devices and Network Attached Storage (NAS) devices where video content is acquired and longer term storage along with more convenient media content access is required.

Figure 2:
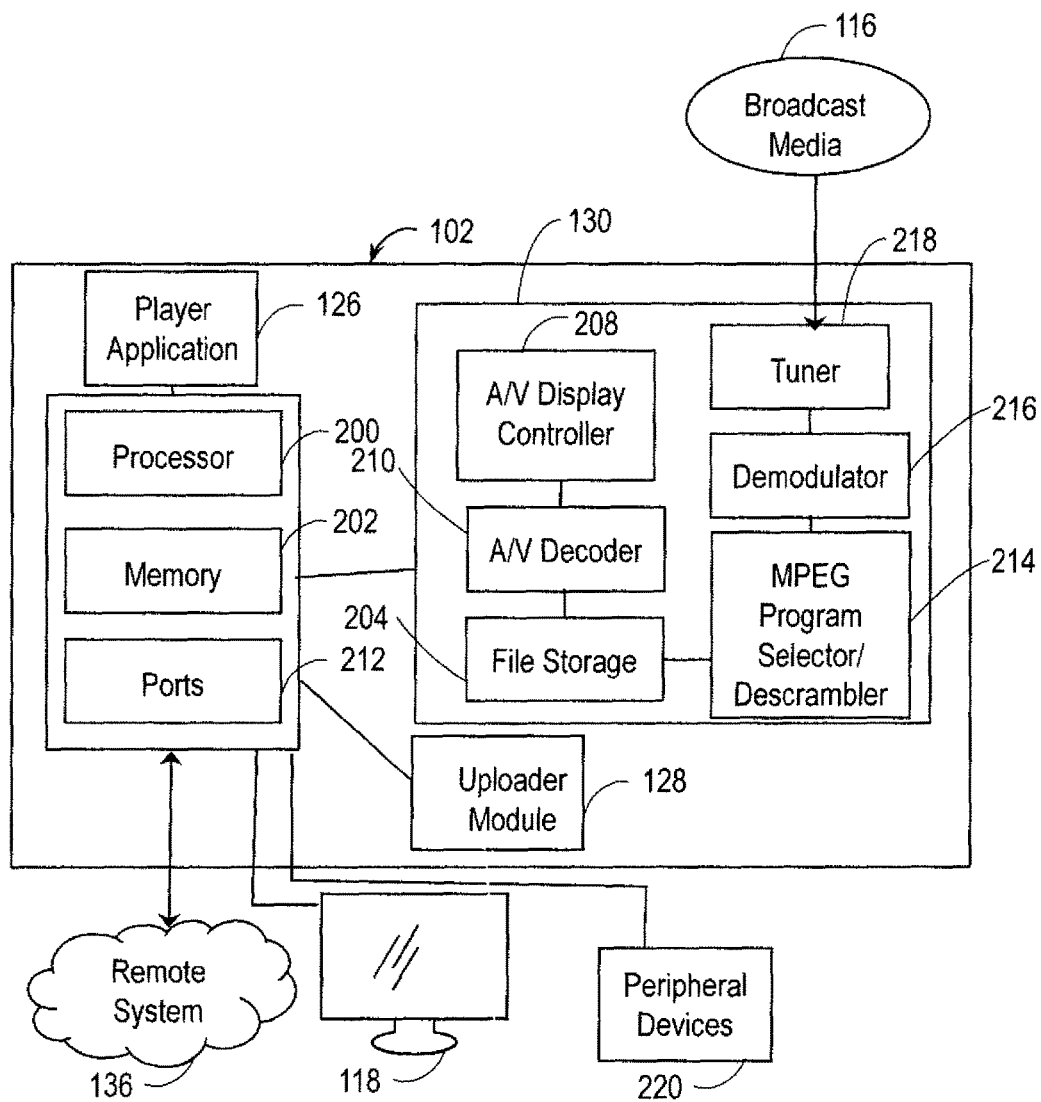
FIG. 2 is a schematic diagram of a DVR system of the digital media storage and playback system.

Referring next to FIG. 2, a schematic diagram of the exemplary DVR system 102 of the digital media storage and playback system 100 is shown in one embodiment of the present invention. Shown are the display 118, the broadcast media source 116, the uploader module 128, the DVR engine 130, the remote system 136, the player application 126, a processor 200, a non-transitory memory 202, a plurality of ports 204, an A/V display controller 208, an A/V decoder 210, file storage 212, an MPEG program selector/descrambler 214, a demodulator 216, a tuner 218, and at least one peripheral device 220.

The processor 200 is coupled to the non-transitory memory 202, and in some embodiments is configured to run the required hardware/software of the DVR system 102. In other embodiments additional processors/memory are included for running other components, for example the uploader module 128. The DVR system 102 includes the DVR engine 130. The DVR engine 130 includes the analog tuner 218, which is configured to receive the broadcast media source 116 (e.g. OTA, cable or satellite signal) and pass it to the demodulator 216. The demodulator 216 demodulates the broadcast signal in to MPEG Transport stream multiplex, or other standard container format for transmission and storage of audio, video, and Program and System Information Protocol (PSIP) data and/or DVR FIT data. The demodulated broadcast signal is then passed to the MPEG program selector/descrambler 214, which selects a specific MPEG program in the multiplex and descrambles the program if necessary. The selected MPEG program is then stored on the file storage 212. The file storage 212 can be a "spinning disk" type storage or solid state (i.e. "flash"). The file storage 212 is used to store broadcast media or to buffer currently viewed media to support a "live pause" feature. The file storage 212 may be internally or externally coupled to the DVR engine 130.

The A/V decoder 210 receives broadcast media stored on the file storage 212 (or in the case of real-time viewing, from the MPEG program selector/descrambler 214) and decodes the broadcast media for display on the display 118. The A/V display controller 208 receives the decoded content and sends it to the port 204 coupled to the display 118, where it is displayed on the display 118 coupled to the DVR system 102.

The DVR system 102 is communicatively coupled to the remote system 136 via an internet connection or other network connection. In one embodiment the DVR system 102 is coupled to an internet network via one of the ports 204. The DVR system 102 also includes ports 204 for coupling to the display 118 and to optional peripheral/input devices 220 such as a keyboard, mouse, remote control, external file storage, and specialized audio/video components Referring next to FIG. 3, a flowchart of a method for uploading a program to the storage server 104 is shown. Shown are a begin uploading step 300, a determine block boundaries step 302, an encrypt data step 304, a generate block ID step 306, a send block ID to storage server step 308, a match block ID decision point 310, a proceed to next block step 312, an upload block step 314, an entire program uploaded decision point 316, and an end upload step 318.

During the first begin uploading step 300, a user of the DVR system 102 inputs a command to the DVR system 102 directing the DVR system 102 to upload a first broadcast program to the digital media system 100. The first broadcast program may be identified by any system/method commonly known in the art, for example, in-stream markers (DVB) or scheduled time/channel (ATSC). The DVR system 102 receives the real-time broadcast using the components previously described in FIG. 2. At the time period specified, the DVR system 102 receives the specified broadcast and processes it for digital uploading, including demuxing the input into PES output, and extracting PTS (presentation time stamp), video GOP (group of pictures) stream positions, and audio frame positions of the broadcast input. The uploader module 128 also sends an indication to at least one media server API of the content/account server 108 indicating that a new program will be uploaded. The media server API creates a new entry for the recording in the list/catalog for that user. The media server API also establishes a location in the storage server 104 for the program recording to be stored, informs the storage server 104 that the new recording is starting at the established location, and informs the transcoding server 106 where to save the transcoded file on the storage server 106.

In the next determine block boundaries step 302, as the DVR system 102 receives the broadcast, the uploader module 128 receives the processed media content from the DVR engine 130 and divides the media content into sequential "blocks". An exemplary algorithm for determining block size and extents is described further below in FIG. 7 Each DVR system 102 connected to the digital media system 100 runs the same block algorithm, such that DVR systems 102 receiving the same program will divide the program into identical blocks. The DVR system 102 also identifies the broadcast metadata.

The method can then proceed to the optional encrypt data step 304, or proceed directly to the generate block ID step 306. During the optional encrypt data step 304, the block is encrypted.

The method proceeds to the generate block ID step 306. As the extents of each block of program data is identified by the block algorithm, a block identification (block ID) is assigned to each block and stored in one or multiple files. The block ID is determined using a method that provides a unique identifier for each unique block, based on the characteristics of the block data. In one embodiment, the SHA-256 hash function is used. In another embodiment, the SHA-256 hash is used with a sparse ID system (described further below in FIG. 7) for aiding in transcoding de-duplication while still acquiring a faithful copy of the program as received by the DVR system 102. In some embodiments, only the sparse ID method is used to generate the block ID, which is more tolerant of packet errors on upload and also efficient for transcoding.

In the next send block ID to storage server step 308, the DVR system 102 sends an indication of the block to be uploaded to the storage server 104, at least including the block ID of the block.

In the next match block ID decision point 310, the storage server 104 compares the block ID value to existing block ID values. In one embodiment, the storage server 104 checks a backing store for pre-existence of block stored by same using the block ID. The backing store may be the AWS S3, or in other embodiments may be a direct attached storage device on the storage server 104, network attached system arrays (NAS) or another type of cloud storage system, for example Microsoft® Azure. In another embodiment, the storage server 104 checks a database including a table of all block IDs already known to the storage server 104. If the block ID matches the block ID of one block already stored on the storage server 104, the process proceeds to the proceed to next block step 312. If the block ID does not match the block ID of one block already stored on the storage server 104, the process proceeds to the upload block step 314.

In the proceed to next block step 312, as an identical block is already stored on the storage server 104, the storage server 104 appends the block ID to the file associated with the program recording. The storage server 104 also sends an indication to the DVR system 102 to skip to the next block. The process then returns to the determine block boundaries step 302, and the method repeats with the next block in the recording. It should be noted that the transcoding process described below in FIG. 5 typically takes place generally simultaneously with the uploading process, i.e. as the blocks are uploaded, a first block after uploading can be sent to the transcoding server 106 while a second block is simultaneously being uploaded from the DVR system 102.

If the block ID does not match a previously known block ID, during the upload block step 314 the uploader module 128 uploads the block to the storage server 104, and the storage server 104 stores the block in the established file along with the associated data including the block ID. The block ID is added to the one or more block ID storage locations (e.g. the backing store or the block ID database). The process then proceeds to the entire program uploaded decision point 316.

During the entire program uploaded decision point 316, if additional blocks remain in the program, the process returns to the proceed to next block step 312, and the process repeats: finding the boundaries of the next block, hashing the block data to obtain the block ID, and uploading the block if not already in the storage server 104.

When the DVR system 102 has uploaded all blocks of the program, the process proceeds to the end upload step 318, and the uploading process is ended, with the uploader module 128 sending an indication to the storage server 104 that the program has ended and for the file to be closed. The transcoding server 106 completes the transcoding and writes the transcoded program to the storage server 104 at the designated location and informs the media server API 120 that the transcoding is complete. The media server API then updates the list/catalog with the transcoded file, and the transcoded file is now discoverable and available for playing.

Referring again to FIG. 3, it will be recognized that within a mature digital TV broadcast network, content broadcast over channels on one transmitter will often be replicated on channels from other transmitters. Further, multiple digital receivers receiving the same broadcasts will, to a large extent, be receiving the same data not withstanding environmental issues causing packet data loss and corruption in the broadcast received. In this regard much of the content will be homogeneous.

Block data matching is the process of breaking up the received broadcast data into blocks according to the well-defined block algorithm running on multiple DVR systems 102. The blocks are then hashed to obtain the block ID based on the content of the block so that they can be uniquely identified to the cloud storage system before upload. Given that the block ID is used to identify a specific block of data, the technique used to generate the block ID must be sufficiently strong to avoid collisions. SHA-256 is a good candidate for this purpose. Blocks from disparate DVR systems 102 can then be compared by block ID to identify duplication in the system 100 and prevent upload for duplicated blocks (in-transit block de-duplication). The storage server 104 then combines the uploaded blocks into lists of blocks to form the file for the broadcast recording. Multiple program files may link to common blocks where there is block duplication between files (at-rest block de-duplication) but any rendering of an individual file will faithfully reproduce an accurate representation of the original broadcast data received by that DVR system 102. End users will only have access to files associated with their device and online account.

Encryption of the block may be required, for example if the underlying storage system does not have built-in encryption of where security of built-in encryption is considered inadequate. By making use of a cryptographic technique called convergent encryption, encryption can be applied to blocks for content protection purposes while still preserving the attributes of the block that enables de-duplication—namely multiple DVR systems 102 will generate an identical key for the same block of data so that multiple DVR systems 102 will produce the same encrypted output data—ensuring that the block matching is effective. This can be used for at-rest and in-transit data security or as part of a wider DRM system.

In one embodiment, three block IDs are determined and stored for each encrypted block. A blockHash is an intermediate hash of the plain text block data, using the SHA-256 algorithm. The blockHash must be resistant to pre-image attacks as the blockHash is used as a seed for the block ID, and must be resistant to collisions. The blockHash is secret, intermediate value, and is destroyed after use.

The second block ID, the previously described block ID, is a hash of the block data using the SHA-256 algorithm as derived from the blockHash. The block ID must be resistant to collisions over decades so as to avoid false-positive on block match hit. The block ID must also be resistant to pre-image attacks so that the blockHash cannot be determined, but the block ID itself is not secret. The block ID, as methioned previously, is also used as the unique identifier of the block for block-matching to avoid duplication.

The third block ID is a blockCryptoKey, obtained by hashing the blockHash using the MD5 hash function which, as the MD5 has a 128 bit value, can also be used as an AES128 CBC (cipher block chaining) key. Use of the MD5 function converts the blockHash to 128 bits without weakening pre-image attack resistance. The use of MD5 may produce collisions, but collision prevention is secondary to pre-attack resistance for the blockCryptoKey. The blockCryptoKey is secret.

Encryption can occur on either the DVR system 102 (preferably) or on the remote system 136. If performed by the DVR system 102, the blockCryptoKey must be transmitted to the remote system 136 as part of the upload protocol.

If more tolerance to packet errors is required alternative block identification schemes can be employed. Digital OTA streams received in locations with poor line of sight from antennae to transmitters can have a number of dropped transport stream packets, either in bursts or sporadically. Block IDs are sensitive to data errors. Two blocks with identical data but where one block has a dropped packet will result in different block IDs and thus each block will be uploaded, stored and transcoded. This impacts the effectiveness of upload compression, storage compression and degrades transcode performance. One solution is to generate an alternative ID which is tolerant to errors which can be used to drive de-dupe decisions instead of the block ID. Use of the alternative ID can be applied according to business policy during upload, storage or transcode in the following combinations: transcode only, transcode+storage, transcode+storage+upload.

For example, a "sparse" technique can be employed where only a subset of the block data is included in the hash. In its most straight forward form the block ID is derived from the cryptographic hash of the entire data contained in the block. Using the entire data, while preventing data collisions, does make the system 100 sensitive to transmission errors at the DVR system 102 receiving the broadcast. A data difference between DVR system 102 receivers resulting from transmission errors will create new unique blocks resulting in more upload bandwidth required, more storage required and more transcoding resources required. To mitigate this an alternative blocking identification scheme can be used which uses sparse sections of data to construct the plain text for the cryptographic hash. The new type of ID is called the "sparse ID" or sID. The sID can be used as an alternative to the block ID thus reducing upload bandwidth requirements and storage, or alongside the block ID where the sID can be used by the transcoding server 106 as a secondary way to identify similar blocks of data. The use of sID is typically controlled by the remote system 136. An exemplary sparse ID (sID) method is described further below in FIG. 8.

To maximize block de-duplication between devices it is important that the common algorithm is deployed on all receiving devices to ensure that the block boundaries are aligned. This boundary algorithm uses the MPEG transport stream timing information, generally primary video stream presentation time (PTS), as a common reference, performs the block boundary calculation algorithm on this timing value to choose the boundary location. As an optimization the algorithm can locate the next closed GOP/recovery point and audio frame to further improve the boundary location. This can make subsequent transcoding operations more efficient but is not a required step. Since the block algorithm is driven on a time basis, packet loss and other differences in data will not cause blocks to go out of alignment between receivers once the broadcast data has returned to normal.

The result is that each cloud storage file fully represents what the user's DVR system 102 received, is fully optimized to remove duplicate data in the storage server 104, and is optimized to minimize network traffic on upload.

It should be noted that in a broadcast network the same feed made available through different transmitters may have slightly modified PCR (program clock reference) values in a given program because the feed has been re-clocked. This difference can be managed by separating the program transport stream into packetized elementary streams on the DVR system 102 and re-muxing (re-multiplexing) within the DVR system 102 which re-clocks the PCR values with a shared algorithm referenced from one of the packetized elementary streams. The resulting mux will be identical on multiple DVR systems 102. Another method includes zeroing out the PCR values, which has no effect on the playability of the stream and may be more cost-effective than re-multiplexing.

Figure 3:
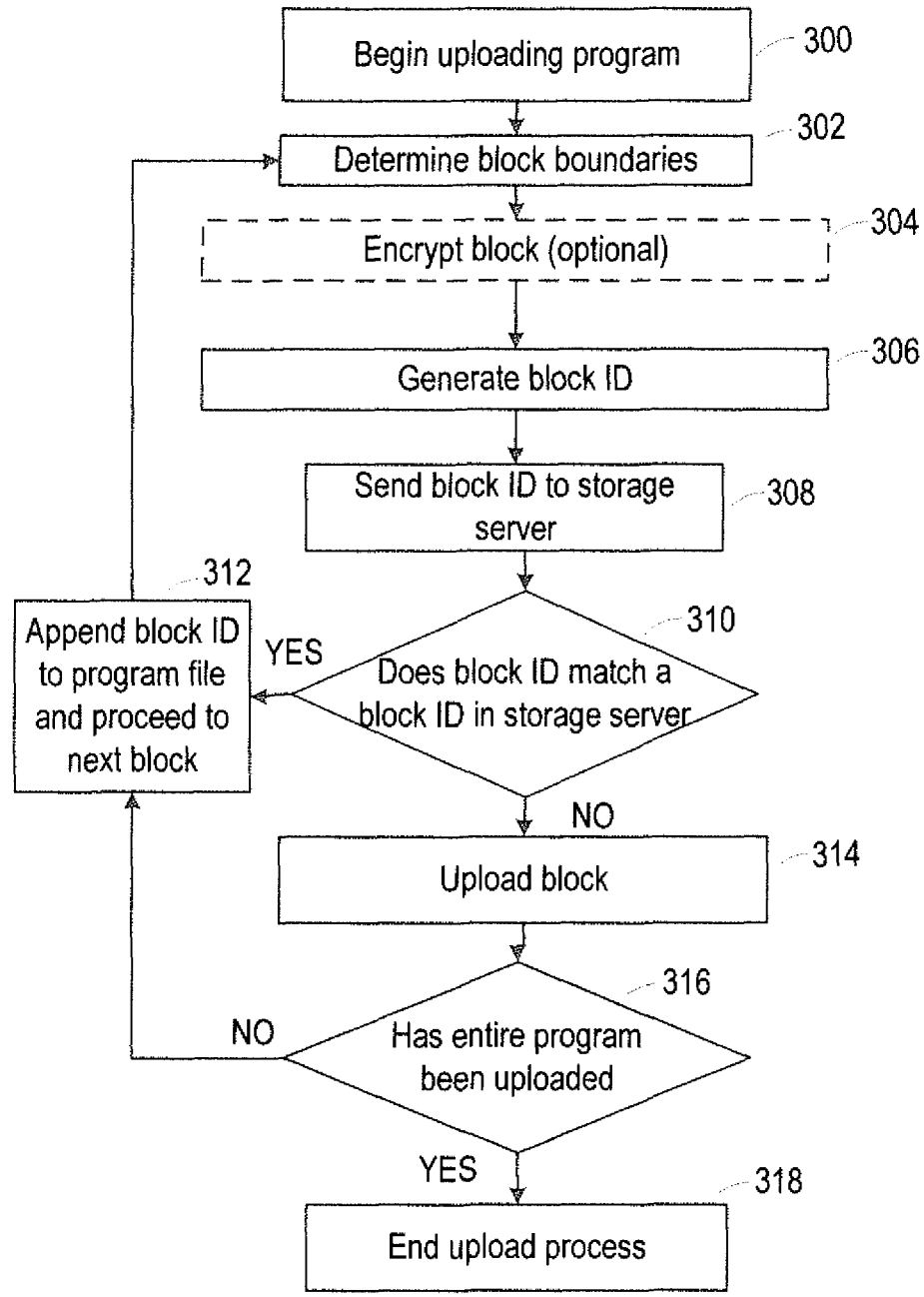
FIG. 3 is a flowchart of a method for uploading a program to the Storage Server of the digital media storage and playback system.

One key consideration for the upload process is how block matching collisions (i.e. a block to be uploaded matches a block already stored on the storage server 104) are handled during uploading. During normal usage, multiple DVR systems 102 will be attempting to upload the same broadcast program. If the DVR system 102 attempts to upload a block and the storage server 104 returns a match, then the DVR system 102 will skip the block upload and move to the next block, as shown in FIG. 3. The storage server 104 will insert the block already in storage into the broadcast program file as if it had been uploaded. Simultaneous uploads from multiple DVR systems 102 will effectively level load according to network bandwidth. DVR systems 102 with the fastest connections will tend to be the first to attempt the upload of a new block and thus will not get a match from the storage server 104. Slower DVR systems 102 will tend to be behind and receive matches from the storage server 104.

The storage server 104 will allow a certain number of simultaneous uploads of the same block for redundancy purposes in case upload fails on a particular receiver.

The process of uploading to the storage server 104 will also include a call to other services (for example a replay program service on the account/content server 108) which may in turn also invoke a transcode operation automatically on that uploaded stream. The transcode invocation model may be speculative (on load), on-demand (on file serving requests) or explicit (in response to user request) based on policy determined by the service.

In one embodiment, the storage server 104 upload and storage capabilities are based on current Amazon Web Services parameters. The AWS S3 bucket storage mechanism and key naming scheme is used to provide a natural block hash matching scheme. The block ID derived from the block hash is used to derive the S3 key name. Linking of blocks to form the complete file is managed using meta files called virtual files or blocklists. Reads and writes to the storage server 104 navigate and manipulate the meta files to form continuous reads and writes of data. It will be understood by those of ordinary skill in the art that the underlying storage may be any suitable system, for example storage arrays supporting SMB/CIFS or NFS style file systems.

Storage server 104 application layers 114 are horizontally scalable and can exist behind a load balancer of the storage server 104 because no state is maintained in the storage server 104 itself.

Access policy and encryption key storage are managed through external services.

Figure 4:
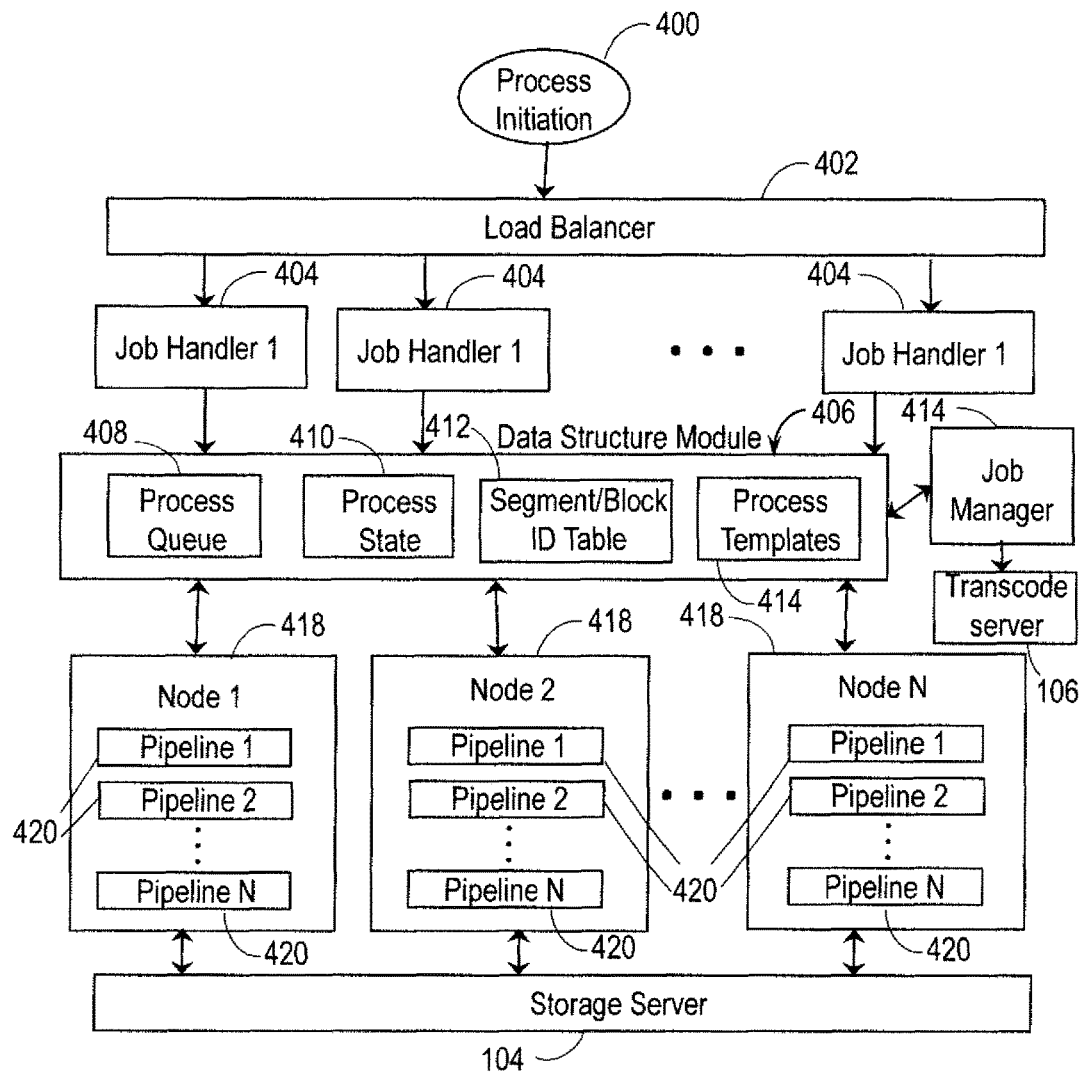
FIG. 4 is a schematic diagram of a transcoding system of the transcoding server of the digital media storage and playback system.

Referring next to FIG. 4, a schematic diagram of a transcoding system of the transcoding server 106 is shown. Shown are a process initiation 400, a load balancer 402, a plurality of job handlers 404, a shared data structure module 406, a process queue 408, a process state 410, a segment/block ID table 412, process templates 414, a job manager 416, a plurality of nodes 418, a plurality of pipelines 420, and the storage server 104.

The transcoding server 106 processes for transcoding an uploaded broadcast program stored on the storage server 104 are invoked via the at least one media server API running on the account/content server 108. In one embodiment the DVR system 102 calls the media server API, which in turn makes a transcoding job request to the transcoding server 106. The transcoding job request specifies input, outputs, job processing templates (including transcoder settings) and a requestor job state call back HTTP endpoint.

The transcoding system receives the process (job) initiation request and sends the process initiation 400 request to the load balancer 402 presenting the transcoding API. The load balancer 402 distributes the transcoding job among the plurality of stateless job handlers 404. The job handlers 404 are web application servers, which break up the job into individual processing activities and add the processes to the process queue 408 of the data structure module 406 of the transcoding server 106.

The data structure module 406 also includes the process state 410, a database including the current state of each process. The data structure module 406 also includes the segment/block ID table 412 (described further below) and the process templates 414. The process templates 414 define the parameters for the transcoding, e.g. video codec, audio code, bitrates, stitch segment duration, etc. The job handler is in communication with the data structure module 406 and the transcoding server 106 and manages launching and terminating of nodes 418 based on load.

The data structure module 406 is also in communication with the plurality of nodes 418, each of which is a transcoder server/computing device hosting a node application which can drive one or more of the processing pipelines 420, depending on the capabilities of the node 418. Each node 418 receives transcoding processes from the process queue 408, receives the appropriate data from the storage server 104, returns the transcoded data to the storage server 104, and updates the data structure module 406 as required, for example updating the process state 410 when the process is complete. The transcoding process is described further below in FIG. 5.

Figure 5:
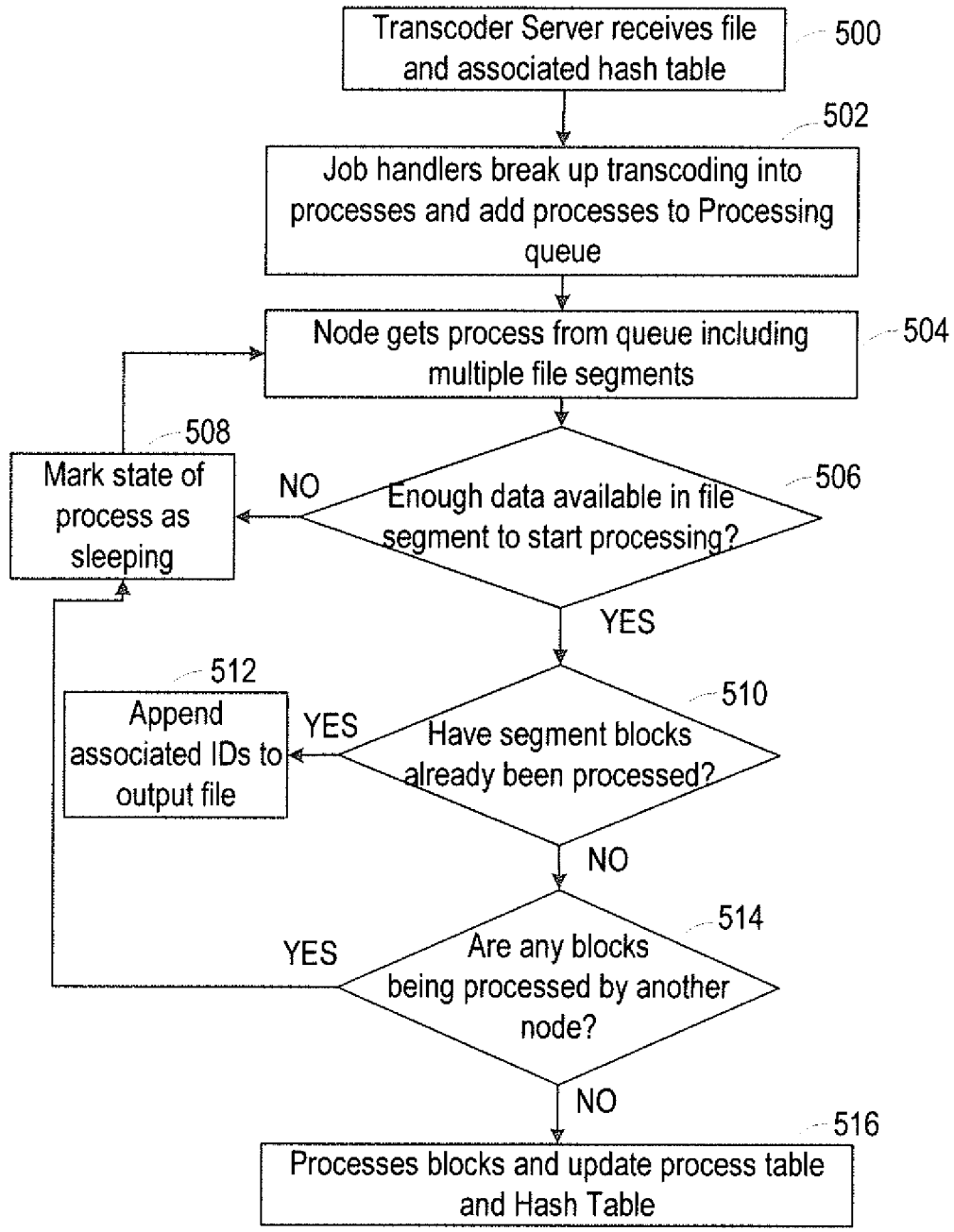
FIG. 5 is a flowchart of a transcoding process of the transcoding server.

Referring next to FIG. 5, a flowchart of a transcoding process of the transcoding server 106 is shown in one embodiment of the present invention. Shown are a receive file step 500, a job handler step 502, a nodes receive processes step 504, a start process decision point 506, a mark state as sleeping step 508, a segment already processed decision point 510, an append associated IDs step 512, a blocks currently processed decision point 514, and a process blocks step 516.

In the first receive file step 500, the transcoding server 106 receives the job initiation request to transcode a first program that has been previously uploaded to the storage server 104 as previously described. The transcoding job initiation request specifies inputs (e.g. the file and associated block IDs, and metadata), outputs, job processing templates (including transcoder settings) and a requestor job state call back HTTP endpoint. The process initiation 400 request is sent to the load balancer 402 presenting the transcoding API.

In the next job handler step 502, the load balancer 402 distributes the transcoding job (process) among the plurality of stateless job handlers 404. The job handlers 404 break up the job into individual processing activities and add the processes to the process queue 408 of the data structure module 406 of the transcoding server 106. The process then proceeds to the nodes receive processes step 504.

During the nodes receive processes step 504, at least one of the plurality of nodes 418 (most likely a number of nodes 418) receives a process from the process queue 408. Each node 418 may receive the process at any time during the transcoding process. Each node 418 checks the process queue 408 at startup, at the completion of a previously-received process, and periodically while idle (e.g. every 250 ms). To receive the process, the node 418 makes a fetch request to the process queue 408 and pulls off one or more processes based on a current capacity of the node 418 versus the process template 414 and other factors such as whether the processes share the same input. Directing processes that share the same input to a single node 418 reduces network traffic within the cluster of nodes 418.

The process includes at least one program segment to transcode. Each segment is comprised of at least one block as previously defined. Because of video compression schemes used, slight differences in input data between two transcodes of the nominally same source (block) will create very different outputs for the length of the transcode following the point of difference. Even if the block data is identical, dithering techniques in transcoding can produce different output. To optimize for this case, the program files are segmented to prevent the data differences from propagating beyond the segment boundaries. We refer to these segments as stitch-segments. Segmentation means that the transcoder will be reset after each segment so that state in the previous segment is not propagated to the next segment. The key to this approach is to carefully select the length of the segment to provide for good picture quality (short segments reduce the effectiveness of the video compression algorithm and lead to pulsing effects in the video). If the segment is too long then data de-duplication performance will be hampered.

Segmentation is built on top of the underlying block-based storage of the storage server 104. Segments contain one or more underlying sequential blocks and will generally, for maximum efficiency, align to block boundaries. This works because the DVR system 102 block algorithm selects block boundaries on the basis of closed GOP and audio frame alignment. This means that the node 418 can easily process the segment source data from the exact beginning to the exact end of the segment allowing segments to be stitched together to form the transcoded file. However, the key optimization is that if the transcoding node 418 keeps track of the segments that it has already processed by calculating the "group of block IDs" (concatenation of block IDs of each block in the segment, provided by the storage server 104) of the segment and using that to look up the group of block IDs for the output of the segment, the transcoder can quickly determine if the blocks in the segment have been encountered before in the digital media system 100, and simply re-use the transcoded blocks from a previous processing session in the output file, saving precious transcoding resources.

A further optimization is for the DVR system 102 to generate an index file where each entry in the index file relates presentation time to byte offset and uploads the index file to the storage server 104 alongside the upload content. If the index file also happens to align entries to block boundaries this makes it simple for the transcoding node 418 to read the index file and to identify segment boundaries in the cloud without CPU and network traffic intensive file parsing.

In fact, even if the block boundaries are not aligned to transcode segments there is still significant benefit. The segmentation process can strip partial block data from the source before and after the segment before feeding into the transcoding node 418. This stripping mechanism can be achieved by replacing unwanted presentation packets (video, audio, etc.) with null packets which will be ignored by the transcoding node 418.

Transcode segment boundaries must be selected in a similar fashion to the data block boundaries. A common algorithm is deployed on all transcoding nodes 418 to ensure that the transcode segment boundaries are aligned. This boundary algorithm uses the MPEG timing information (either primary video stream PTS or primary audio PTS if there is no video) as a common reference, performs a transcode segment boundary calculation algorithm on this timing value to choose the boundary location and then identifies the nearest key frames (GOP or Instantaneous Decoder Refresh picture and complete audio frames) in each elementary stream to choose the final boundary. This may involve selecting data from previous data blocks to make sure that all the necessary presentation packets are included that match the key frame PTS position and stripping any unwanted packets. In this process, special attention must be paid to audio and video frame timing alignment. Audio frames and video frames are not typically of the same duration. To avoid audio glitches the nodes 418 must honor the relative timing positions of the audio packets vs video packets as they are delivered to the node 418 and the resulting transcoded audio frames must align to the input audio frames at the segment boundaries.

In operation, a transcoder service stich segment is defined, which is a time range that maps to a data range in the program file comprised of the plurality of blocks. A transcoder service stitch segment ID is generated for each stitch segment. The stitch segment ID is a "fingerprint" of the data range of the program file and comprises a hash of the list of block IDs of the blocks included in the stitch segment time range, and the transcoder parameters for the process. The segment/block ID table 412 stores previous transcode results, i.e. for every stich segment ID that has already processes the segment/block ID table 412 includes the list of block IDs mapped to that stitch segment ID. The stich segment ID/block ID mapping is cached and can be retrieved from the cache to be appended to an output file from the transcoding process.

The segmentation technique has a number of benefits. Firstly, the transcoding resources can be used as a pool and used in parallel if desired. Secondly, speculative transcoding can be performed segment-by-segment in a sparse fashion across the length of a recording. This improves perceived playback performance because playback can be forced to start from the speculatively transcoded segment providing valuable time for the on-demand transcoding to start up. Thirdly, video awareness is established on the user's DVR system 102 device and only made use of in the remote system 136 (index files are per recording or live viewing session).

Depending on the demand on the plurality of nodes 418 and job request rate there may be a large number of processes added to the process queue 408 and many nodes 418 checking and fetching processes from the process queue 408. The process queue 408 is designed to handle these actions in a fast and atomic manner to allow for scale. Further scale can be achieved by using sharding techniques on the storage server 104 effectively splitting up the global process queue 408 into a several queues across multiple data structure server instances and sub-clustering nodes 418 and job handlers 404 accordingly. Additionally the system 100 can include a monitoring process which based on how busy the cluster is will start up or shut down one or more nodes 418 to manage load. This mechanism is called auto-scaling.

In the next start process decision point 506, after receiving the process the node 418 begins to process the segment. At each stitch point the node 418 is in communication with the storage server 104 and determines if there is enough available data for the segment to start or continue transcoding of the next segment. If the storage server 104 does not have enough of the program data for the node 418 to transcode the segment, the process proceeds to the mark state as sleeping step 508. If the storage server 104 has enough of the program data for the node 418 to transcode the segment, the process proceeds to the segment already processed decision point 510.

During the mark state as sleeping step 508, the node 418 "sleeps" the process and updates the process state 410 table to indicate that the process is sleeping. The node 418 also updated the process state 410 table with an estimated wake-up time. Any node 418 in the transcoding server 106 will check the process state 410 table to see if the process (or any other sleeping process) can be resumed, before fetching a new process from the process queue 408. The transcoding process then returns to the nodes receive processes step 504 and the node 418 receives another process.

If the node 418 has enough data to transcode the segment, during the segment already processed decision point 510, the node 418 checks whether the segment has already been processed. The node 418 checks the segment/block ID table 412 and determines if the blocks included in the segment have already been processed by another node 418. If the blocks have been already processed, the process proceeds to the append associated IDs step 512. If the node 418 determines that the blocks have been previously processed with the same template parameters (as indicated by an identical transcoder service stitch segment ID), the node 418 fetches the associated block ID or block IDs from the segment/block ID table 412 and appends the block IDs to the transcoding output file for the transcoding process, skipping the write of the actual block data. The process is then complete and the node 418 can fetch another process from the process queue 408.

If the blocks have not already been processed, process continues to the blocks currently processed decision point 514. In the blocks currently processed decision point 514, the node 418 checks the segment/block ID table 412 and determines if one or more blocks are in process with the another node 418 in the current transcoding process. If one or more blocks are in process, the method proceeds to the mark state as sleeping step 508.

If, instead, there are not entries in the segment/block ID table 412 for the blocks of the segment for the current process template, the process proceeds to the process blocks step 516. During the process blocks step 516, the node 418 completes the processing operation (transcoding) of the blocks, which either executes in software on the node 418 or may be delegated to dedicated hardware transcoding resources if available. The node 418 then updates the process state 410 table and the segment/block ID table 412.

As processes start, complete and periodically (if progress is requested) the nodes 418 make a process state HTTP callback to the original requester providing job and process states.

Figure 6:
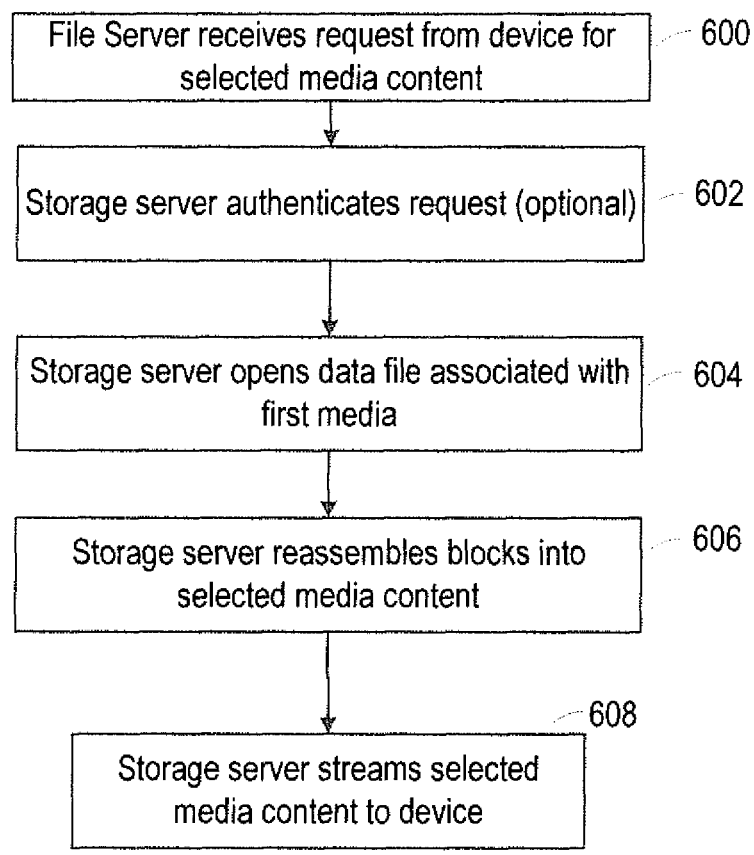
FIG. 6 is a flowchart of a process for media playback using the digital media storage and playback system.

Referring next to FIG. 6, a flowchart of a process for media playback using the digital media system 100 is shown. Shown are a receive request step 600, an authentication step 602, an open data file step 604, a reassemble blocks step 606, and a streamed media step 608.

In the first receive request step 600, the storage server 104 receives a media request from a user via the DVR system 102 or one of the computing devices for a selected media content previously broadcast. In one embodiment the request is an HTTP GET request including authentication credentials/token (if required), a byte range and a URL targeting the streamed file. A storage server web application calls a storage server open file action. If the data file is encrypted using the convergent encryption scheme in the uploader, a set of block keys for the file is also retrieved and cached for use. The process optionally proceeds to the authentication step 602, where the content/account server 108 authenticates the account.

The storage server 104 can authenticate the request by verifying the credentials or token and confirming the access policy, Authentication status is then cached for a period of time. After the optional authentication step 602, the process proceeds to the open data file step 604. During the open data file step 604, the open file action opens the unique file associated with the requested URL to fetch the list of block IDs and byte offsets for each block that forms the underlying data for the requested file so that the program data can be retrieved from the backing store (S3 in this exemplary case). The requested byte range is also verified, then the S3 key associated with the file is returned as a file handle and all the retrieved data is cached for further use. The request may also indicate a byte range of the file stored at the specified URL.

In the next reassemble blocks step 606, the storage server 104 calls a read operation with the file handle. The read action retrieves the associated block ID list and keys from the cache, identifies which transcoded blocks to read, and joins the resulting data together into a media stream. Multiple read operations on the same file handle can be performed.

The process then proceeds to the streamed media step 608, where the media stream is then returned to the requesting device, which displays the stream.

Figure 7:
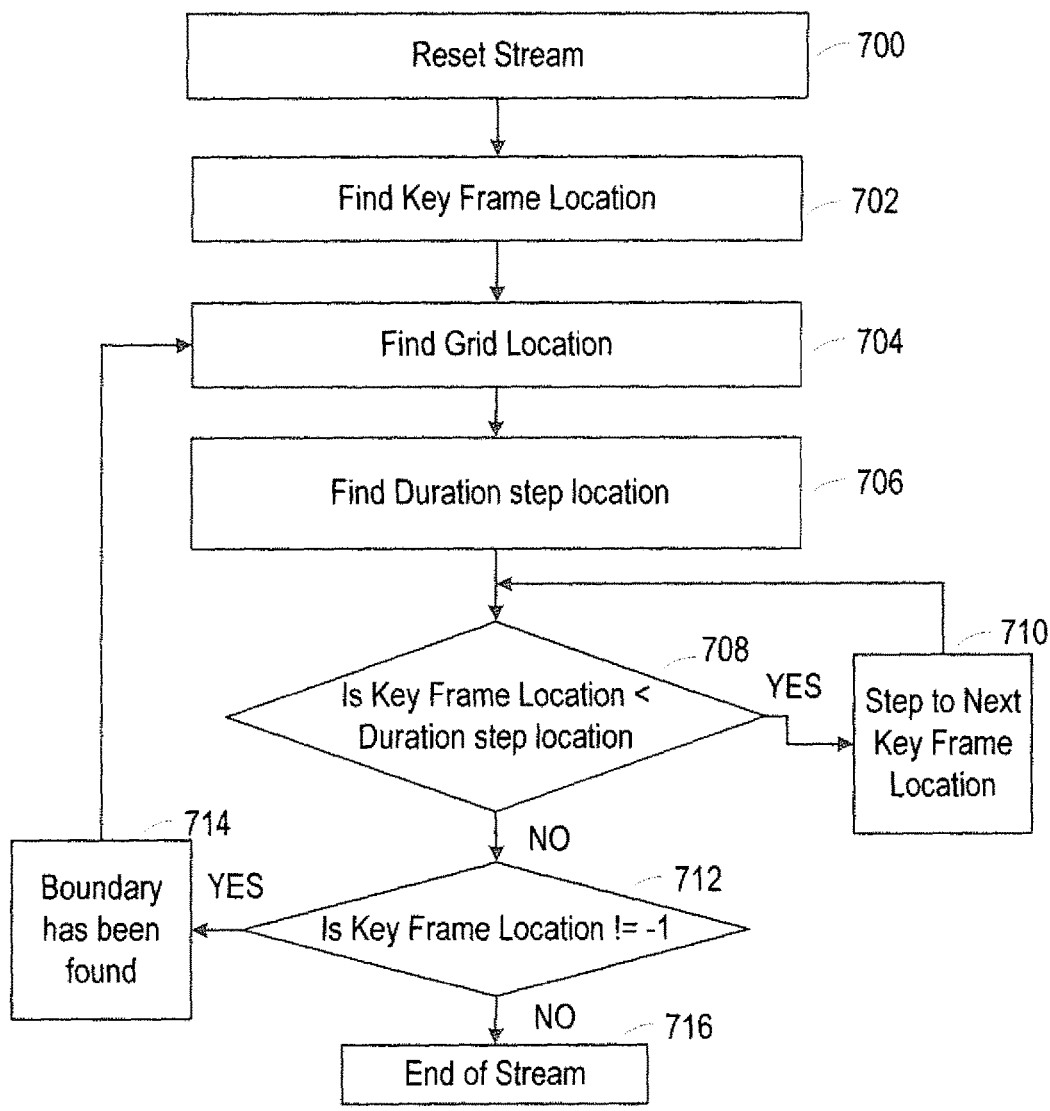
FIG. 7 is a flowchart of a block algorithm for calculating block boundaries in accordance with one embodiment of the present invention.

Referring next to FIG. 7, an exemplary block algorithm is shown in one embodiment of the present invention. Shown are a reset stream step 700, a find key frame location step 702, a find grid location step 704, a find duration step location step 706, a key frame location decision point 708, a step to next key frame step 710, a check key frame value decision point 712, a found boundary step 714, and an end of stream step 716.

The block algorithm is performed by the uploader module 128 of the DVR system 102, and segments the stream received from the DVR engine 130 into consistent, identifiable blocks as previously described. In the initial reset stream step 700, the media stream is reset to the beginning of the stream. It will be understood that the PTS values at the key frame boundaries are available to the uploader module 128.

In the next find key frame location step 702, the uploader module 128 parses the stream for the next key frame (the first key frame, initially) and updates a currentPTS variable for the location of the first key frame.

The process then proceeds to the find grid location step 704. A grid location is a location in the media stream that is offset upstream from the key frame location. The grid enables a standard frame of references between blocks for different streams, enabling the algorithm to recover from packet loss and to establish common reference points where streams start and/or end at different places on different DVR systems 102. In one embodiment, the grid location is obtained by dividing the currentPTS by a predefined block duration value, truncating the results to an integer, and multiplying the results by the block duration value. For example, if the key frame location is 2250 and the block duration value is 1000, the divided and truncated value is 2. The grid location is then 2*1000=2000. The block duration value is also a target duration of the block. The grid location is the start location of the block.

In the next find duration step location step 706, the grid location is added to the duration (i.e. the location is "stepped" a length of the duration) to find a tentative grid end location of the block. In the current example, the duration step location is 2000+1000=3000. A duration length between the initial key frame and the grid end location is then checked to ensure that the duration length is not shorter than a minimum acceptable duration length. If the duration length is shorter than the minimum acceptable duration length, the grid end location is moved downstream by one duration step. In the current example, the grid end location would be moved to 3000+1000=4000. When the duration length is greater than the minimum acceptable duration length, the process proceeds to the key frame location decision point 708.

In the key frame location decision point 708, the algorithm checks whether the current key frame location (the currentPTS variable value) is downstream of (i.e. greater than) the grid end location. If the key frame location is upstream of the grid end location, the process proceeds to the step to next key frame step 710, where the next key frame location is found and the currentPTS variable is updated. The process then returns to the key frame location decision point 708, and the loop repeats as long as the key frame location is upstream of the grid end location. If the key frame location is downstream of (i.e. is greater than) the grid end location, the process proceeds to the check key frame value decision point 712. For example, for the currentPTS location of 2250, and the grid end location of 3000, initially the key frame location (currentPTS) is upstream of the grid end as 2250<3000. The next key frame is then found, for example at 2750, and the currentPTS is updated. In the next iteration, the currentPTS (2750) is still less than the grid end location of 3000, so the next key frame is found, for example at 3250. The currentPTS is now greater than the grid end location (3250<3000) so the process then proceeds to the check key frame value decision point 712. If no next key frame is found in the step to next key frame step 710, the currentPTS value is set to −1 (or any other value not valid for a key frame value), indicating the end of the stream.

In the check key frame value decision point 712, if the currentPTS value is equal to −1, the stream has ended and block process is terminated. If the currentPTS value is not equal to one, the block end is set as the last found key frame, i.e. at the currentPTS value (3250 in this example). The block start location is the key frame location originally found in the find key frame location step 702 (2150 in this example). Associated actions are then performed on the now-defined block (determining the block ID, contacting the storage server 104, checking for de-duplication, uploading the block, etc.), and the process returns to the find grid location step 704 and the process repeats for consecutive blocks until the stream has ended.

Figure 8:
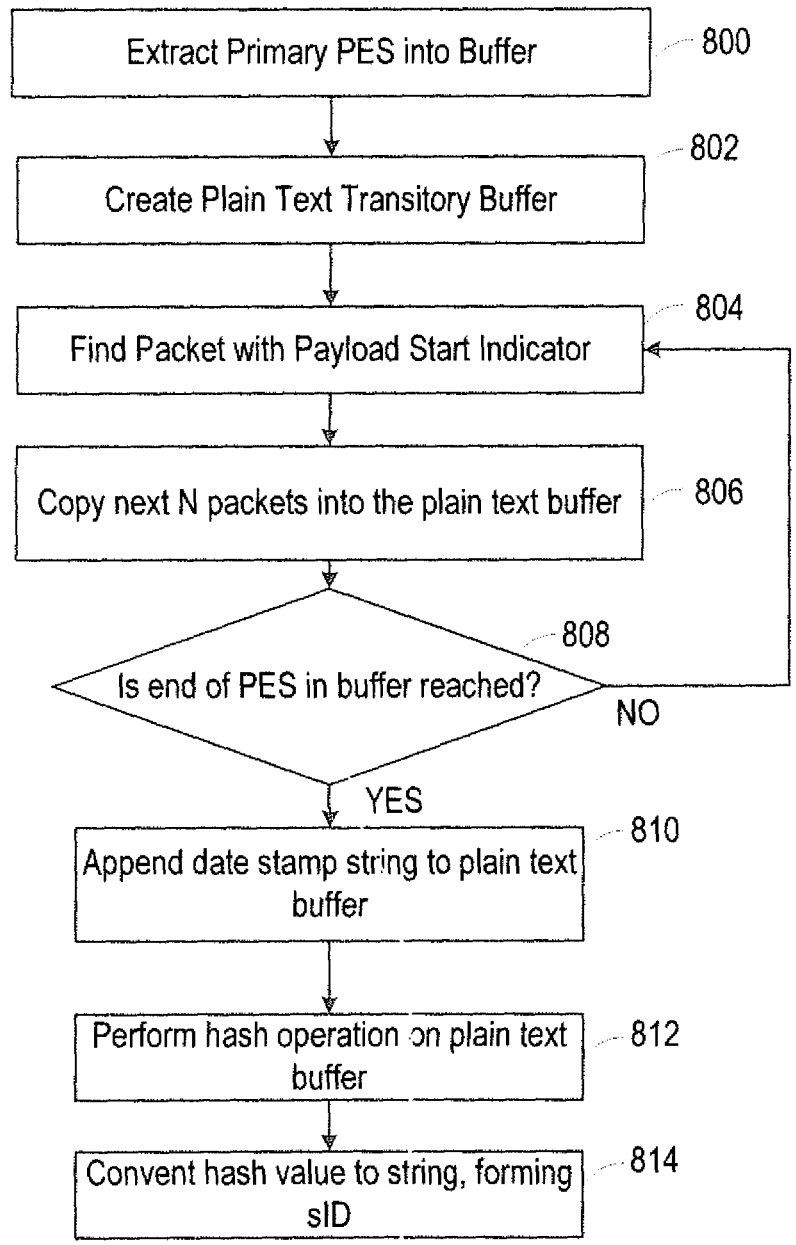
FIG. 8 is a flowchart of an exemplary sparse ID generation method in accordance with one embodiment of the present invention.

Referring next to FIG. 8, a flowchart of an exemplary sparse ID generation method is shown. Shown are a extract primary PES into buffer step 800, a create plain text buffer step 802, a find packet with start indicator step 804, a copy packets step 806, a end of PES decision point 808, a append date stamp string step 810, a perform hash operation step 812, and a convert hash value step 814.

A key foundational component of the system 100 is the generation of a Block ID. In its most straight forward form as described the block ID is derived from the cryptographic hash of the entire data contained in the block. Using the entire data, while preventing data collisions, makes the system 100 sensitive to transmission errors at receivers. A data difference between receivers resulting from transmission errors will create new unique blocks resulting in more upload bandwidth required, more storage required and more transcoding resources required. To mitigate for this an alternative blocking identification scheme can be used which uses sparse sections of data to construct the plain text for the cryptographic hash. This new type of ID is the sparse ID (sID). The sID can be used as a direct replacement for a full hash-based Block ID, thus reducing upload bandwidth requirements, storage and transcode resources. In another embodiment, the sID is used alongside the block ID where it can be used just by the transcoding server 106 to construct the segment ID, instead of using concatenated block IDs.

The sID is calculated similarly to the block ID, using a SHA-256 hash but instead only hashing sub-ranges of data in the MPEG2 transport stream packets that are spaced out sparsely. The sID calculation is optimized for DTT (digital terrestrial television, i.e. OTA, cable or satellite broadcasts) scenarios. The sparseness means that there is a high probability that data errors will be skipped.

SID processing is coupled to either the primary video PES stream or primary audio stream if there is no video. If there is more than one video stream in the MPEG program, then the uploader module 128 will need to identify the primary video on the basis of highest resolution*framerate. Additionally to avoid potential block collisions because of the reduced data in the hash, the hash is "salted" with a date stamp which is calculated as:

<Local date/time of file or stream creation>minus X hours and truncated to yyyymmdd The use of local time and X hour offset is to move the value rollover time point to an off-peak point to minimize the effects of real time clock differences between uploader clients. X is tentatively set at 4 and must be controlled by configuration.

As with the block ID determination, the sID value is calculated by the uploader module 128. The process utilizes the block parameters previously determined, for example using the block algorithm of FIG. 7.

In the first extract primary PES into buffer step 800, the uploader module 128 demultiplexes and extracts the primary packetized elementary stream (PBS) into a transitory buffer memory where the primary stream is identified as described earlier.

In the next create plain text buffer step 802, the uploader module 128 creates a temporary plain text buffer to hold plain text transport stream packets. The plain text packets stored in the plain text buffer will form the source data for a hashing operation.

In the next find packet with start indicator step 804, the uploader module 128 iterates through each transport stream packet until a packet is found with a payload start indicator is set to 'true'.

During the next copy packets step 806, the next N packets are copied into the plain text buffer, where N is a pre-defined parameter that specifies how sparse the sID will be. A smaller N will create a sparser ID but be more prone to data collision. A larger N will increase sensitivity to packet errors.

The process then proceeds to the end of PES decision point 808. If an end of the primary stream buffer memory has been reached, the process continues to the append date stamp string step 810. If the end of the primary stream buffer has not been reached, the process returns to the find packet with start indicator step 804.

In the append date stamp string step 810, the uploader module 128 appends the date stamp string described above to the plain text buffer. The process then proceeds to the perform hash operation step 812.

In the next perform hash operation step 812, a hash operation is performed on the plain text buffer. In one embodiment SHA-256 is used but other suitable hash algorithms may also be used.

In the final convert hash value step 814, the hash value from the perform hash operation step 812 is converted to a string using the base64 string encoding algorithm, creating the conveniently formatted sID value for the block.

The transcoding server 106 will then leverage sIDs instead of block IDs to determine transcode segment stitch matching (see FIG. 5 for segment stiching)/de-duplication if available. The most convenient way and efficient way is for the transcoding server 106 to access these sIDs is via a blocklist, where the blocklist is a file linking the individual blocks. The sIDs could be exposed as an additional column in the blocklist or outright replace block IDs in the blocklist. This feature should only be enabled on storage server 104 services configured for the transcoding server 106.

The storage server 104 can leverage sIDs in two ways: storing of multiple blocks sharing sIDs could be reduced to one stored block; and during upload returning 412 precondition based on an sID match.

Sparse ID support can be implemented in a variety of ways however the following should be considered. The sparse ID algorithm may well be tuned over time so flexibility is required in terms of server-side control of it. Given that sparse IDs can be used to improve storage and transcode de-duplication alone without modifying upload it is reasonable to consider a server-side only implementation although an uploader implemented version would be more efficient. In fact, in some embodiments sIDs are only created and used inside the storage server/transcoding server environment.

Maintaining the use of block IDs increases collision avoidance. Sparse IDs are inherently more prone to collision because the sID is sparsely calculated. The OTA, cable or satellite-originated data is mixed with desktop uploaded storage server data and sIDs are used for DTT and block IDs for desktop, there is a reasonable chance of storage collision between completely unrelated data. Additionally because block ID/sID mapping will need to be maintained, the block IDs can be preserved in the blocklist which meets the internal only implementation requirement.

Data architecture for the sparse ID system maintains a mapping between the sID and the block ID and also maintains a continuity count error count (CC) in a cache backed by S3. The block ID references a stored block which has the lowest CC of the collection of blocks that share the sID. If a new block is presented to the storage server 104 which has a lower CC, then this mapping is updated.

The sID is maintained in the blocklist, in one embodiment by GET requests that use sID to map the block ID referenced in an entry to the aliased the sID mapped block ID. A reverse mapping is maintained between the blockID and the sID.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A digital media storage and playback system comprising:

a DVR system associated with a user and connected to a network, comprising:
- at least one processor coupled to a non-transitory memory;
- an A/V module configured to capture and store broadcast media content and prepare the broadcast media content for uploading on a network,
- an uploader module coupled to the A/V module, processor and memory and configured to divide captured and stored broadcast media content into a plurality of sequential blocks and assign a block ID to each block, the block ID determined by a hash algorithm whereby blocks comprising duplicate content are associated with identical block IDs, the uploader module further configured to determine boundaries of the sequential blocks based at least in part by a grid location algorithm and a block duration value; and
- a local system network port configured to connect to the network and send and receive data through the network, wherein each block ID is transmitted to a storage server through the network; and the storage server connected to the network, comprising:
- a server non-transitory memory;
- a server processor;
- at least one application configured to run on the processor and perform the steps of:
  - repeatedly receive block IDs from the DVR system,
  - add the received block IDs to a block ID database, and
  - compare each received block ID with contents of a block ID database stored on the storage server and configured to store block IDs, wherein when the received block ID fails to match one of a plurality of stored block IDs, a stored block associated with the block ID is uploaded to the storage server, whereby the broadcast media content is stored on the storage server.

2. The digital media storage and playback system of claim 1, the A/V module further comprising at least one of a tuner, a demodulator, an MPEG program selector/descrambler, and a file storage.

3. The digital media storage and playback system of claim 1, the A/V module further comprising an A/V decoder and an A/V display controller, whereby the broadcast media content is configured for real-time display on a display coupled to the DVR system.

4. The digital media storage and playback system of claim 1, further comprising a transcoding server coupled to the storage server and comprising at least one processor and a non-transitory memory, the transcoding server configured to receive broadcast media content from the storage server and transcode the broadcast media content, and send the transcoded broadcast media content to the storage server, whereby the transcoded broadcast media content is configured for streaming to a device over a network.

5. The digital media storage and playback system of claim 4, wherein the DVR system is configured to receive streaming broadcast media content and display the streaming broadcast media content on a display coupled to the DVR system.

6. The digital media storage and playback system of claim 4, wherein the transcoded broadcast media content is streamed in response to a request from the user received by the storage server from a device connected to the network.

7. The digital media storage and playback system of claim 4, wherein the transcode server identifies a plurality of sequential segments of the broadcast media content, wherein each segment transcoded independently by the transcoding server.

8. The digital media storage and playback system of claim 7, wherein each segment comprises at least one block.

9. The digital media storage and playback system of claim 1, wherein an identity of the user is associated with the uploaded broadcast media content, and the associated identity is stored on a content/account server in communication with the storage server, a transcoding server coupled to the storage server and the DVR system and configured to transcode the uploaded broadcast media content, and the DVR system.

10. The digital media storage and playback system of claim 9, wherein transcoded broadcast media transcoded by the transcoding server is streamed to a device over the network in response to a request from the user having an identity associated with the transcoded broadcast media content.

11. The digital media storage and playback system of claim 1, wherein the DVR system is configured to encrypt the broadcast media content.

12. The digital media storage and playback system of claim 1, wherein the block IDs are determined using a SHA-256 hash.

13. The digital media storage and playback system of claim 1, wherein the broadcast media content is OTA, cable, or satellite content.

14. The digital media storage and playback system of claim 7, wherein the transcoding server is configured to concatenate block IDs of all blocks included in each segment and compare each set of concatenated block IDs with contents of a segment/block ID database stored on the transcoding server and configured to store concatenated block IDs, wherein when the concatenated block IDs fail to match one of a plurality of stored concatenated block IDs, the segment associated with the concatenated block IDs is transcoded.

15. A method for storing broadcast media content, comprising the steps of:
- receiving by a DVR system of broadcast media content, the DVR system comprising an A/V module, a non-transitory memory, and at least one processor, wherein the DVR system is in communication with a network;
- dividing by the DVR system of the broadcast media content into a plurality of sequential blocks, wherein block boundaries are determined at least in part by a grid location algorithm and a block duration value;
- associating by the DVR system of a block ID with each block of the broadcast media content, the block ID determined by a hash algorithm whereby blocks comprising duplicate content are associated with identical block IDs;
- sending by the DVR system of each block ID to a storage server via the network;
- comparing by the storage server of the received block ID with contents of a block ID database stored on the storage server and configured to store block IDs, whereby if the received block ID fails to match one of the stored block IDs the block associated with the block ID is uploaded to one of the storage server and a storage device in communication with the storage server, and the received block ID is stored in the block ID database, whereby the broadcast media content is stored on the storage server.

16. The method for storing broadcast media content of claim 15, further comprising the steps of:

sending by the storage sever of a stored broadcast media content to a transcoding server coupled to the storage server, the transcoding server comprising at least one processor and a non-transitory memory coupled to the processor and configured to transcode media for online streaming;

transcoding of stored broadcast media content by the transcoding server;

sending, by the transcoding server, of the transcoded broadcast media content to the storage server; and storing of the transcoded broadcast media content on the storage server, whereby the transcoded broadcast media content is configured for streaming to a device over a network.

17. The method for storing broadcast media content of claim 16, wherein the DVR system is configured to receive streaming transcoded broadcast media content and display the streaming transcoded broadcast media content on a display coupled to the DVR system.

18. The method for storing broadcast media content of claim 16, wherein the transcoded broadcast media content is streamed in response to a request from a user of the DVR system received by the storage server from a device connected to the network.

19. The method for storing broadcast media content of claim 16, further comprising the step of the transcoding server dividing the broadcast media content into a plurality of sequential segments prior to transcoding the broadcast media content.

20. The method for storing broadcast media content of claim 16, wherein each segment comprises at least one block.

21. The method for storing broadcast media content of claim 15, wherein an identity of a user of the DVR system is associated with the broadcast media content, and the associated identity is stored on the storage server.

* * * * *